(12) United States Patent
Kloth

(10) Patent No.: US 6,470,114 B1
(45) Date of Patent: Oct. 22, 2002

(54) RETROREFLECTIVE CONDUCTORS FOR OPTICAL FIBER INTERCONNECTS

(75) Inventor: Axel K. Kloth, Milpitas, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/379,562

(22) Filed: Aug. 23, 1999

(51) Int. Cl.[7] ................................. G02B 6/42
(52) U.S. Cl. ...................... 385/31; 385/18; 385/47
(58) Field of Search .................. 385/31, 39, 18, 385/47, 32

(56) References Cited

U.S. PATENT DOCUMENTS

| | | | |
|---|---|---|---|
| 4,325,638 A | * | 4/1982 | Takeda et al. ............... 356/375 |
| 4,545,643 A | | 10/1985 | Young et al. ............... 350/96.2 |
| 4,569,569 A | | 2/1986 | Stewart ................... 350/96.19 |
| 5,225,942 A | * | 7/1993 | Ikeno et al. ................. 359/836 |
| 5,422,645 A | | 6/1995 | Nettleton et al. ............. 342/45 |
| 5,481,631 A | | 1/1996 | Cahill et al. .................. 385/18 |
| 5,521,992 A | | 5/1996 | Chun et al. ................... 385/14 |
| 5,548,669 A | | 8/1996 | Anderson et al. ............. 385/19 |
| 5,631,988 A | | 5/1997 | Swirhun et al. .............. 385/89 |
| 5,905,826 A | * | 5/1999 | Benson, Jr. et al. .......... 385/31 |
| RE36,231 E | | 6/1999 | Rondeau ...................... 385/81 |
| 5,915,057 A | | 6/1999 | Weigel ........................ 385/76 |
| 6,275,626 B1 | * | 8/2001 | Laor ........................... 385/18 |

\* cited by examiner

Primary Examiner—Frank G. Font
Assistant Examiner—Layla Lauchman
(74) Attorney, Agent, or Firm—Fish & Richardson P.C.

(57) ABSTRACT

An optical fiber interconnect is provided having a tetrahedral or corner cube retroreflector. The optical fibers are provided in sufficiently close proximity to the retroreflector that a desired level of reflected light is provided to the receiving fiber. In one embodiment, the optical fibers are provided in contact with the retroreflector.

17 Claims, 5 Drawing Sheets

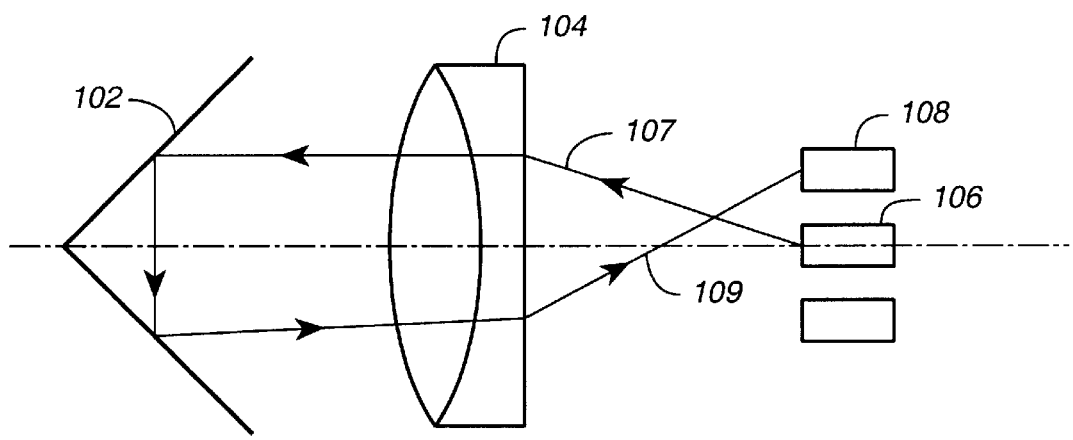
FIG._1 (PRIOR ART)
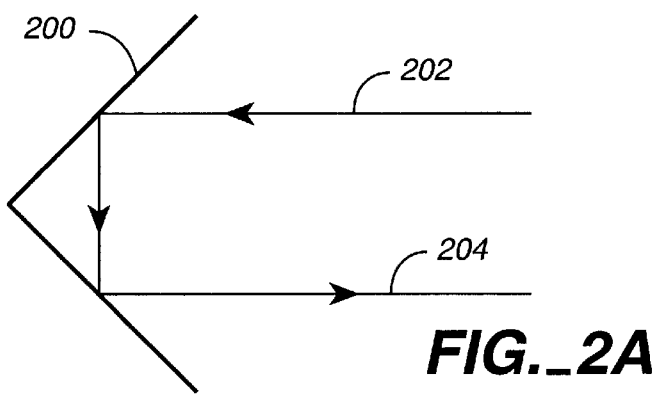
FIG._2A
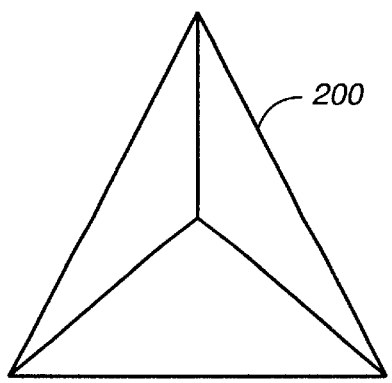
FIG._2B

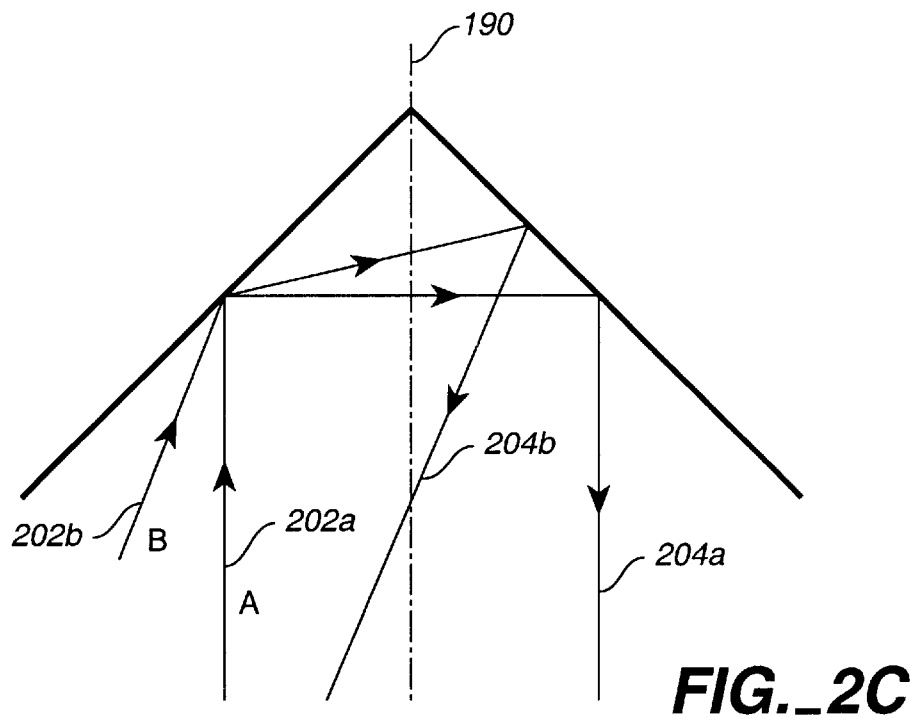
FIG._2C
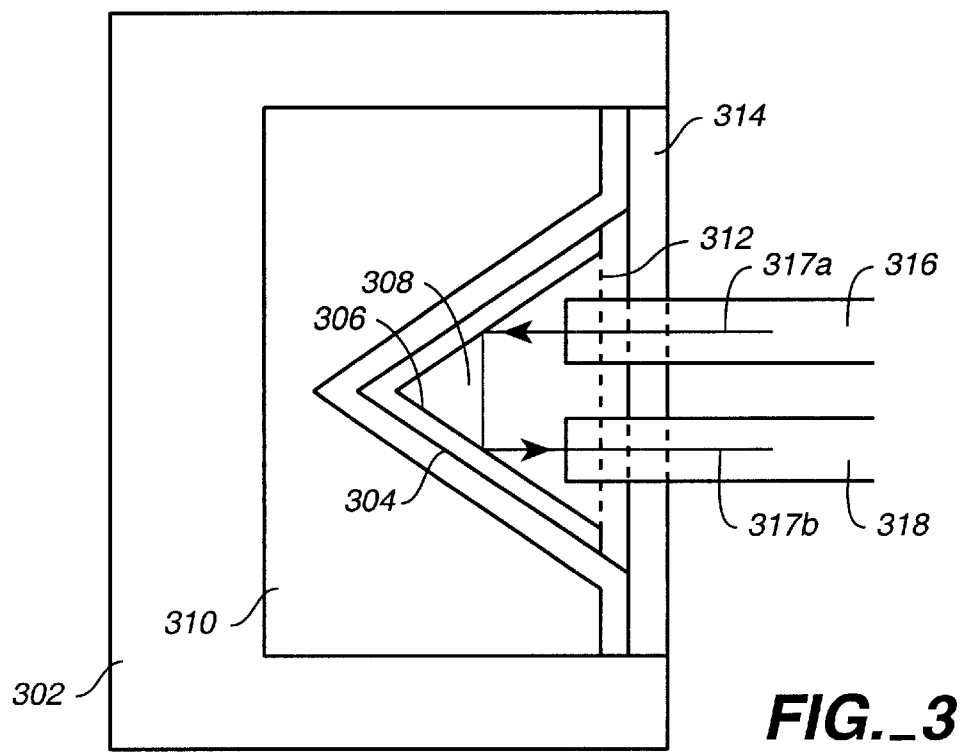
FIG._3

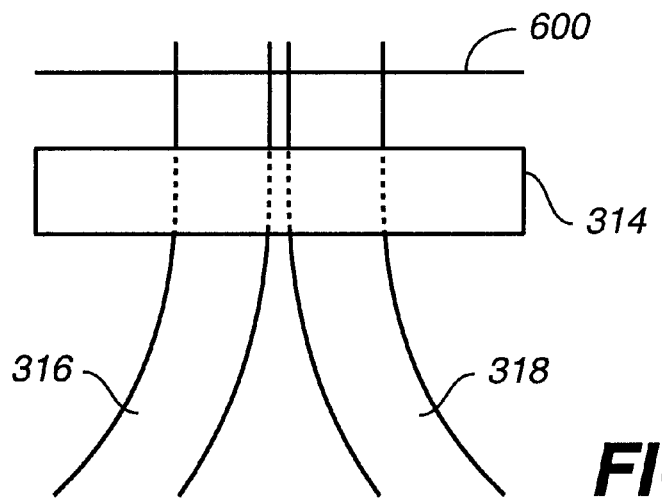
FIG._4A
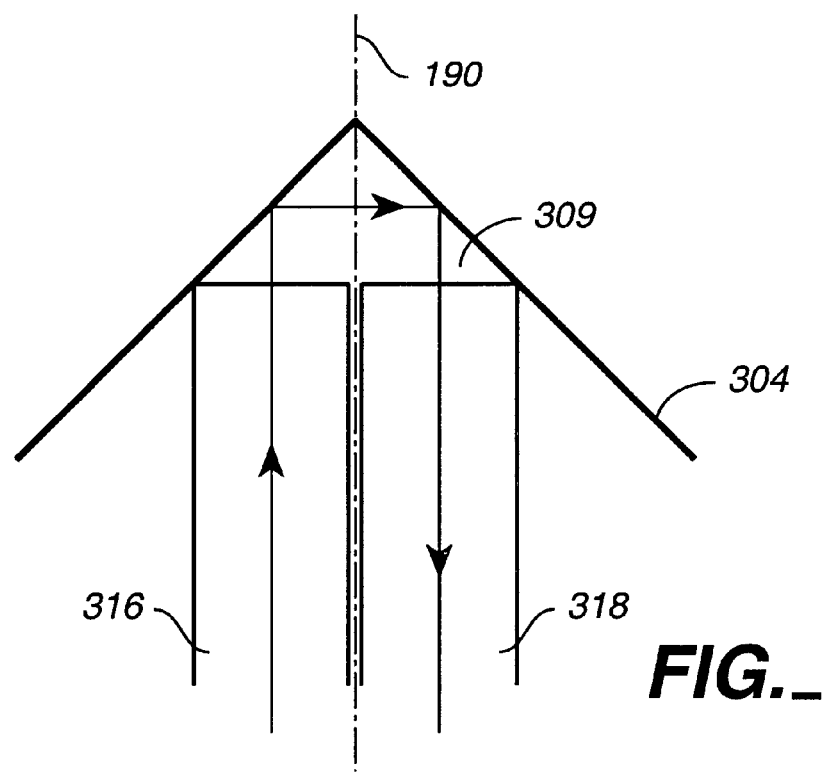
FIG._4B

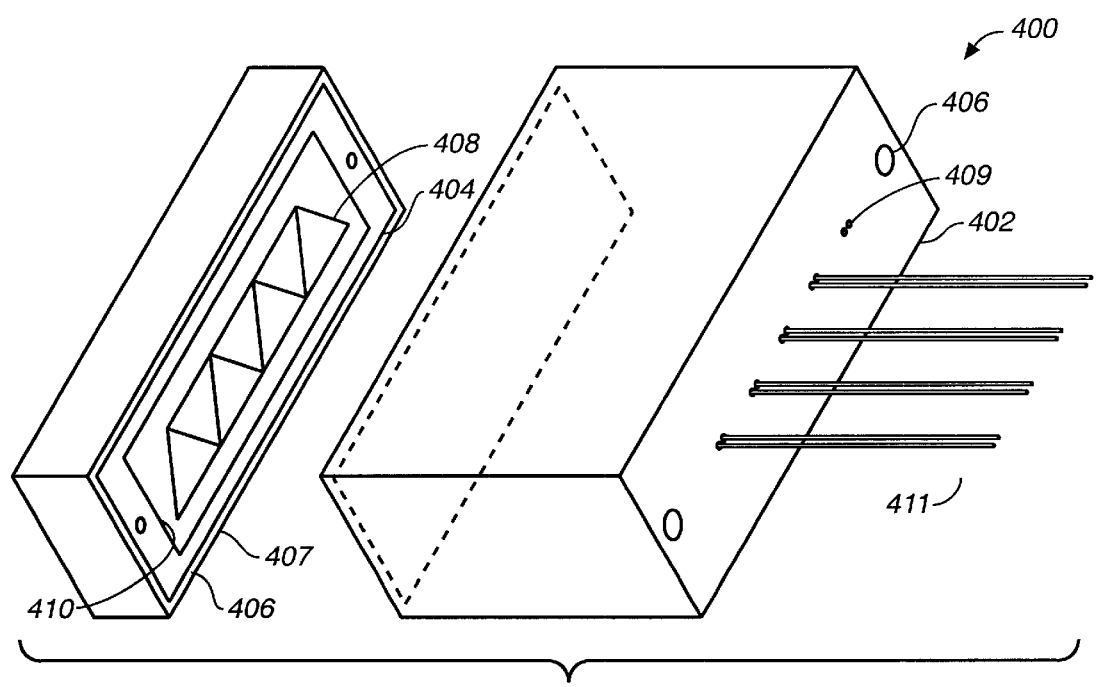
FIG._5A
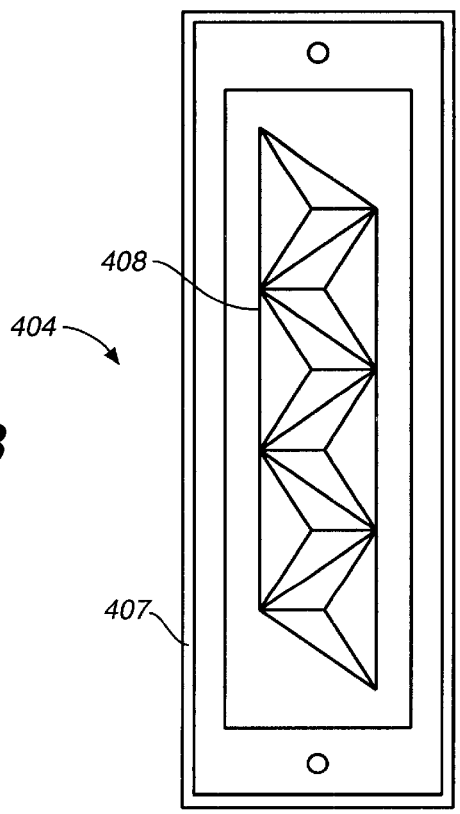
FIG._5B

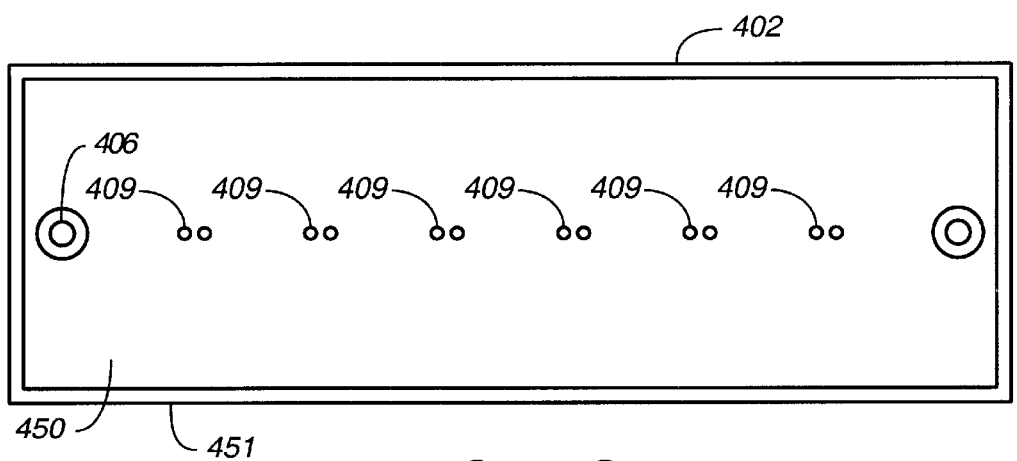
FIG._5C
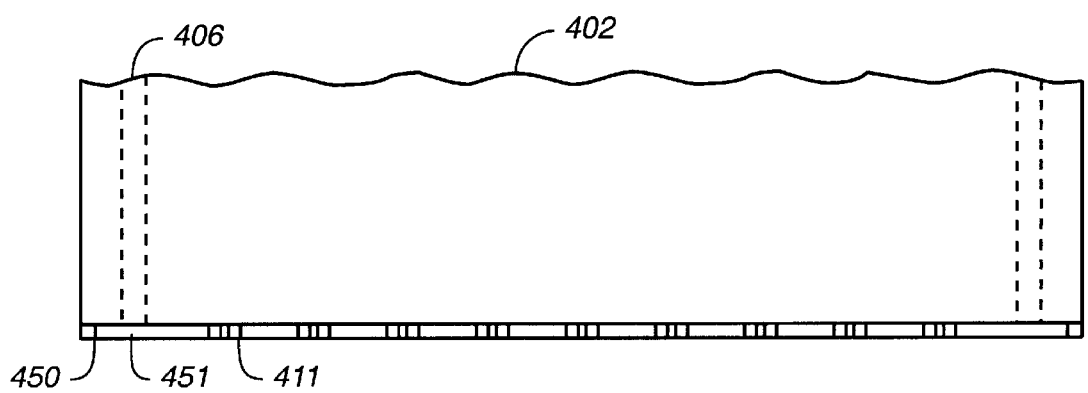
FIG._5D

RETROREFLECTIVE CONDUCTORS FOR OPTICAL FIBER INTERCONNECTS

BACKGROUND OF THE INVENTION

1. Field of the Invention

The present invention relates to optical fiber technology and, particularly, to an improved optical fiber interconnect.

2. Description of the Related Art

An important aspect of optical fiber technology is the interconnection of one optical fiber to another wherein one optical fiber transmits optical radiation to another. A good optical interconnect between optical fibers requires high coupling efficiency (i.e., low loss of light from the coupling), ease of making the coupling, and low cost for making the interconnect.

In such interconnects, proper alignment of the optical fibers and relatively precise mechanical fitting is essential. One such interconnect is shown in FIG. 1. As shown, an optical fiber 106 provides a light beam toward a lens 104 along path 107. The light beam exits the lens 104 and is reflected by a retroreflector 102, such as a roof prism, along path 109. The light beam is then received at optical fiber 108. While the system of FIG. 1 is apparently effective, it is disadvantageous in that axial alignment of the optical fibers is still essential and the system is relatively complex, requiring at least one complex lens 104.

As such, there is a need for an improved optical fiber interconnect having high coupling efficiency, relatively low cost, ease of manufacture, and low dependence on axial alignment.

SUMMARY OF THE INVENTION

These and other drawbacks in the prior art are overcome in large part by an optical fiber connector according to the present invention. According to one embodiment of the invention, an optical fiber interconnect is provided having a tetrahedral or corner cube retroreflector. The optical fibers are provided in sufficiently close proximity to the retroreflector that a desired level of reflected light is provided to the receiving fiber. In one embodiment, the optical fibers are provided in contact with the retroreflector.

An optical fiber interconnect according to one embodiment of the invention includes a housing having a receiving end and a corner cube retroreflector disposed therein. The corner cube retroreflector is open to the receiving end. One or more optical fibers may be secured within the optical fiber interconnect such that their transmit and receive ends are disposed within a concavity defined by the corner cube retroreflector and a plane at the mouth of such a corner cube retroreflector. The optical fibers are thereby positioned such that a desired level of optical radiation provided from a first optical fiber is reflected back toward the other optical fiber. For example, the optical fibers may be provided in contact with the retroreflector.

A method for constructing an optical fiber interconnect according to one embodiment thus includes providing a plurality of optical fibers in proximity to one another, laying the optical fibers out substantially parallel to one another, cutting or breaking off their ends, and providing them to the corner cube retroreflector. Advantageously, the end surfaces need not be absolutely perpendicular relative to the traces of light in the fibers.

According to another embodiment of the invention, an optical fiber interconnect for at least one set of optical fibers is provided. The optical fiber interconnect includes a receiving member and a retaining member. The receiving member may include therein an array of corner cube retroreflectors. The retaining member includes a plurality of holes for receiving sets of optical fibers which are then provided to the corner cube retroreflectors. In addition, in one embodiment the retaining member includes a raised rim or lip which mates with a corresponding coupling surface on the receiving member.

BRIEF DESCRIPTION OF THE DRAWINGS

A better understanding of the present invention can be obtained when the following detailed description is considered in conjunction with the following drawings in which:

FIG. 1 is a diagram of a prior art optical fiber connector;

FIG. 2A, FIG. 2B, and FIG. 2C are diagrams of a retroreflector according to an embodiment of the invention;

FIG. 3 is a diagram of an optical fiber interconnect according to an embodiment of the invention;

FIGS. 4A and 4B illustrate schematically a method for making an optical fiber interconnect according to an embodiment of the invention; and FIGS. 5A–5D illustrate an optical fiber interconnect according to an embodiment of the invention.

DETAILED DESCRIPTION OF THE INVENTION

Turning now to the drawings and, with particular attention to FIGS. 2A–2C, a retroreflector 200 for use in an optical coupler according to the present invention is shown. FIGS. 2A & 2C illustrate side views and FIG. 2B illustrates a top view of the retroreflector 200. As can be seen, the retroreflector 200 is embodied as a corner cube or tetrahedral retroreflector. The retroreflector 200 is configured such that an incident beam of light 202 will be reflected back in the direction of incidence as a beam 204. Thus, an optical fiber interconnect according to the present invention may be provided, wherein a transmitting fiber is positioned along path 202 and a receiving fiber is provided along the path 204. Advantageously, as seen in FIG. 2C, the transmitting and receiving beams need not be parallel to an axial line 190 (i.e., a line that bisects the angle of the retroreflector). So long as the transmitting and receiving beams are substantially parallel to one another, the retroreflector will reflect substantially all of the incident light back parallel to the incident beam. Thus, FIG. 2C illustrates a light beam A and a light beam B. The light beam A includes an incident trace 202a and a reflected trace 204a. The trace 202a and is substantially parallel to the axial line 190, as is the resulting reflected trace 204a. The light beam B, however, is out of alignment with the axial 190. Nevertheless, the incident trace 202b will be reflected back substantially parallel to itself, as trace 204b. Thus, so long as optical fibers are substantially parallel to one another, they need not be in perfect alignment with the corner cube retroreflector itself.

A sectional view of an embodiment of an optical fiber interconnect according to an embodiment of the present invention is shown in FIG. 3. The optical fiber interconnect 300 includes a housing 302 which, for example, may be cylindrical or barrel shaped. Inside the housing is a corner cube retroreflector 304. The corner cube retroreflector 304 may be embodied as a metal or other material having a reflective surface or coating 306. The corner cube retroreflector 304 is held in place within the housing 302, for example, by a mounting block 310. The corner cube retroreflector 304 and a plane 312 define a concavity 308, as will be explained in greater detail below.

The optical fiber interconnect 300 further includes a retainer 314 positioned relatively near an end of the housing 302. The retainer 314 is provided for securing one or more optical fibers 316, 318 such that ends of the optical fibers 316, 318 are positioned facing the concavity 308 and at least at the plane 312. For example, the ends of the optical fibers 316, 318 may be positioned in contact with the retroreflector 304. The retainer 314 thus includes one or more holes for insertion of the optical fibers therethrough. The optical fibers 316, 318 are positioned relative to one another sufficiently close, or in contact with one another, so as to allow optical radiation transmitted from one fiber (e.g., trace 317a) to be reflected back to the other fiber (e.g., trace 317b). The concavity 308 may be filled with a material having a refractive index similar to that of the optical fibers themselves. It is noted that, while illustrated with only two optical fibers being provided to the interconnect, more than two may be provided. Thus, FIG. 3 is exemplary only.

FIGS. 4A and 4B schematically illustrate a method for making an optical fiber interconnect according to an embodiment of the invention. As shown in FIG. 4A, optical fibers 316 and 318 are brought into predetermined proximity to one another and their ends secured substantially parallel to one another, for example, by the retainer 314 or other retaining device. The ends are then cut or broken off along line 600. Advantageously, precise perpendicularity of the ends with the optical fiber axes is not required. Once this has occurred, the ends of the optical fibers 316, 318 are positioned relative to the retroreflector 304, for example, as shown in FIG. 4B. As noted above, it is not necessary to precisely align the fibers with the axial line 190. Then, if desired, the concavity 308 may be filled with a translucent or transparent pplyacrylic material or similar plastic to exclude dust particles.

An alternate embodiment of an optical fiber interconnect in accordance with the present invention is shown in FIGS. 5A–D. The optical fiber interconnect of the embodiment of FIGS. 5A–5D provides for the interconnection of one or more sets of optical fibers. The optical fiber interconnect 400 thus includes a retaining member 402 and a receiving member 404. The receiving member 404 has a generally planar surface 406 in which is provided an array of corner cube retroreflectors 408. The receiving member 404 further includes one or more holes 410 which are provided for guiding or retaining members (not shown). As will be discussed in greater detail below, the holes 410 match similar holes in the retainer and are adapted to secure the retaining member 402 to the receiving portion 404. In addition, a coupling surface 407 may be provided for mating with a corresponding coupling surface on the retaining member 402. For example, the coupling surface 407 may be embodied as an indented or stepped rim around the periphery of the surface 406.

An exemplary receiving member is shown in greater detail in FIG. 5B. As shown, the receiving member 404 includes an array of corner cube retroreflectors 408 in the surface 406. As shown, the corner cube retroreflectors are triangular shaped, and share at least one edge with another corner cube retroreflector. The corner cube retroreflectors are shown in a linear array, though other configurations are contemplated. Moreover, while shown as sharing a single edge, in a two dimensional array, more than one edge may be shared. As discussed above, the surface 406 further includes a coupling surface 407.

Turning back to FIG. 5A, the retaining member 402 includes holes 406 to match the holes 410 of the receiving portion 404. The retaining member 402 further includes a plurality of receiving holes 409 for receiving optical fibers. The receiving holes 409 are positioned to match the corner cube retroreflectors of the corner cube retroreflector array 408. The aligning holes of the receiving member and the retaining member are engageable such that the optical fibers are positioned within the corner cube retroreflectors.

The retaining member 402 is illustrated in greater detail with reference to FIGS. 5C and 5D. In particular, FIG. 5C illustrates the coupling end of the retaining member 402. The coupling end includes a coupling surface 450 having guide holes 406 for the retaining members, as well as hole 409 for receiving optical fibers. The pairs of optical fibers are then provided to the matching corner cube retroreflectors. Further, the surface 450 includes a raised lip or coupling rim 451 which corresponds to the coupling surface 407 of the receiving member 404. As shown in FIG. 5D, the rim 451 serves to protect the ends of the optical fibers 411, which protrude from the surface 450 a predetermined distance so as to couple within the corner cube retroreflectors. Thus, for example, the rim 451 is at least as tall as the protruding ends of the optical fibers.

It is noted that, while illustrated generally with reference to plural retroreflectors, the embodiment of FIGS. 5A–5D is also applicable to a single retroreflector. Further, it is noted that, while illustrated as being generally rectangular in shape, other shapes, such as ellipsoidal, are contemplated. Thus, the figures are exemplary only.

What is claimed is:

1. An optical fiber interconnect, comprising:
    at least one corner cube retroreflector, said at least one corner cube retroreflector defining a concavity; and
    at least one retainer to hold a first optical fiber and a physically separate second optical fiber such that ends of said first and second optical fibers are positioned relative to said concavity at least as close as a plane defining an opening to said concavity.

2. An optical fiber interconnect according to claim 1, wherein said at least one corner cube reflectors are triangular shaped and disposed side by side such that at least one edge is shared between pairs of corner cube reflectors.

3. An optical fiber interconnect according to claim 2, wherein said retainer is configured to hold a plurality of pairs of said first and second optical fibers in proximity to said corner cube retroreflectors.

4. An optical fiber interconnect according to claim 3, including means for aligning said first and second optical fibers with respective ones of said corner cube retroreflectors.

5. An optical fiber interconnect according to claim 1, wherein said ends of said first and second optical fibers are maintained in contact with said corner cube retroreflector.

6. An optical fiber interconnect according to claim 1, further comprising a receiving member for mounting said at least one retroreflector, said receiving member including a coupling surface, said coupling surface configured to mate with a coupling rim on said at least one retainer.

7. A method for manufacturing an optical fiber interconnect, comprising:
    providing at least one corner cube retroreflective element, said at least one corner cube retroreflective element defining a concavity;
    providing at least one plurality of optical fibers each having a first end and a physically separate second end; and
    securing said at least one plurality of optical fibers such that the first ends of said at least one plurality of optical fibers are positioned relative to said concavity at least as close as a plane defining an opening to said concavity.

8. A method according to claim 7, said providing at least one corner cube retroreflective element comprising providing an array of corner cube retroreflective elements.

9. A method according to claim 8, said array comprising an array of triangular shaped corner cube retroreflective elements, predetermined numbers of said corner cube retroreflective elements being edgewise adjacent.

10. A method according to claim 9, said securing comprising securing a plurality of said at least one pair of optical fibers such that each of said pairs is provided to a separate corner cube retroreflective element.

11. A method according to claim 7, wherein said securing comprises securing said a least one plurality in contact with said at least corner cube retroreflector element.

12. The optical fiber interconnect of claim 1 wherein the corner cube retroreflector being essentially completely reflective.

13. The optical fiber interconnect of claim 1 wherein the retainer is a mechanical retainer.

14. An optical fiber interconnect of claim 1 wherein the retainer includes one or more holes for inserting the first and the second optical fibers therethorugh.

15. An optical fiber interconnect, comprising:

a corner cube retroreflector; and a retainer configured to hold an end of a first optical fiber and an end of a second optical fiber such that ends of said first and second optical fibers are positioned relative to said concavity at least as close as a plane defining an opening to said concavity such that light exiting from the end of the first optical fiber enters the end of the second optical fiber, the light exiting from the first end of the first optical fiber parallel to the light entering the first end of the second optical fiber.

16. A method for joining optical fibers, comprising:

providing at least one corner cube retroreflective element;

providing a first and a second optical fiber each having a first end and a second end;

securing the first ends of the first and the second optical fiber on the corner cube retroreflective element such that, light exiting from the first end of the first optical fiber enters the first end of the second optical fiber, the light exiting from the first end of the first optical fiber parallel to the light entering the first end of the second optical fiber; and keeping the second end of the first optical fiber separated from the second end of the second optical fiber.

17. An optical system, comprising:

a corner cube retroreflective element; and a first optical fiber and a physically separate second optical fiber, the first and second optical fibers each having a first end and a second end, the first end of each of the first and the second optical fiber, being secured on the corner cube retroreflective element such that light exiting from the first end of the first optical fiber enters the first end of the second optical fiber, the light exiting from the first end of the first optical fiber parallel to the light entering the first end of the second optical fiber, the second end of the first optical fiber being separated from the second end of the second optical fiber.

* * * * *